(12) United States Patent
Kim

(10) Patent No.: US 9,878,624 B2
(45) Date of Patent: Jan. 30, 2018

(54) APPARATUS FOR CONVERTING POWER OF ELECTRIC VEHICLE

(71) Applicant: HYUNDAI MOBIS Co., Ltd, Seoul (KR)

(72) Inventor: Heon Hee Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/795,271

(22) Filed: Jul. 9, 2015

(65) Prior Publication Data

US 2016/0121741 A1    May 5, 2016

(30) Foreign Application Priority Data

Oct. 31, 2014  (KR) .................. 10-2014-0150194

(51) Int. Cl.
*H02K 7/18* (2006.01)
*B60L 11/18* (2006.01)

(52) U.S. Cl.
CPC ....... *B60L 11/1814* (2013.01); *B60L 11/1811* (2013.01); *B60L 11/1812* (2013.01); *B60L 11/1842* (2013.01); *B60L 11/1851* (2013.01); *Y02T 10/7005* (2013.01); *Y02T 10/7241* (2013.01)

(58) Field of Classification Search
CPC .................. B60L 11/1814; B60L 11/1851
See application file for complete search history.

(56) References Cited

U.S. PATENT DOCUMENTS

| | | | | |
|---|---|---|---|---|
| 2004/0062059 | A1* | 4/2004 | Cheng | B60L 11/1814 363/17 |
| 2012/0007551 | A1* | 1/2012 | Song | B60L 11/1814 320/109 |
| 2012/0020136 | A1* | 1/2012 | Akaishi | B60L 11/1851 363/131 |
| 2012/0119573 | A1* | 5/2012 | Turudic | B60L 11/1803 307/10.1 |
| 2012/0235605 | A1* | 9/2012 | Jang | B60L 11/1803 318/139 |
| 2013/0057200 | A1* | 3/2013 | Potts | H02M 3/33584 320/107 |
| 2013/0124005 | A1* | 5/2013 | Ichikawa | H04L 25/028 701/1 |
| 2013/0293192 | A1* | 11/2013 | Abe | B60L 11/123 320/108 |

* cited by examiner

*Primary Examiner* — Shawki S Ismail
*Assistant Examiner* — Muhammad S Islam
(74) *Attorney, Agent, or Firm* — NSIP Law

(57) ABSTRACT

Provided is a power converting apparatus of an electric vehicle which reduces the number of power semiconductor components to efficiently perform charging, driving, and V2G (vehicle to grid) modes in accordance with choice by a user. The device includes a charging unit which charges commercial power into a battery; an inverting unit which supplies battery power to drive a motor; a switching unit which is connected to the motor, the charging unit, and the inverting unit to be turned on/off in accordance with a switching control signal in accordance with an operation mode selection; and a controller which provides the switching control signal to the switching unit in accordance with a mode selection signal to perform the selected mode operation.

10 Claims, 2 Drawing Sheets

APPARATUS FOR CONVERTING POWER OF ELECTRIC VEHICLE

CROSS-REFERENCE TO RELATED APPLICATIONS

This application claims priority under 35 U.S.C. § 119 to Korean Patent Application No. 10-2014-0150194, filed on Oct. 31, 2014, in the Korean Intellectual Property Office, the disclosure of which is incorporated herein by reference in its entirety.

TECHNICAL FIELD

The present invention relates to a power converting apparatus of an electric vehicle, and more particularly, to a power converting apparatus of an electric vehicle which reduces the number of power semiconductor components to efficiently perform charging, driving, and V2G (vehicle to grid) modes in accordance with choice of a user.

BACKGROUND

Generally, an electric vehicle is developed in order to prevent environmental contamination, which is presently getting worse, and replace limited fluidic energy with a new energy source and drives a motor by a power of a battery to secure traversability at a predetermined speed or higher.

When a driver operates an accelerator pedal, in the electric vehicle, a controller controls a gate frequency of an inverter depending on an amount of manipulated accelerator pedal to control DC power of the battery in a pulse width modulation (PWM) manner. Accordingly, a predetermined amount of current is supplied to a motor and a predetermined torque is generated in accordance with the supplied current amount to rotate the motor, thereby driving the electric vehicle.

Since a secondary battery with a limited capacity is used for a battery of the electric vehicle, the charged power is consumed when the electric vehicle drives for a predetermined time.

When the battery of the electric vehicle is consumed, the driver charges the battery at home or in a charging station such as a gas station provided with a charging device. In this case, the battery of the electric vehicle is charged by being applied with external AC power and converting the applied external AC power into DC power. That is, since the motor of the electric vehicle needs to be driven by a voltage that is charged within the battery, the electric vehicle uses a large quantity of chargeable battery and includes a battery charging device to charge the large quantity of chargeable battery.

In the meantime, a hybrid electric vehicle or a HEV has an electrical driving train and a gasoline or another type of internal combustion engine. An electric motor is solely configured by a battery pack or combined with an internal combustion engine to generate energy and drives the vehicle in accordance with the generated energy.

One problem of the HEVs which are currently massively produced is that a maximum electric potential of a hybrid driving system is not considered by a limited amount of an on-board electric energy storage. Such a problem is handled as increase of an energy storing capacity of a vehicle to use more power instead of the gasoline, which will be implemented in accordance with a technical improvement of a battery or other types of storing systems. An energy storing system with a high capacity may charge an offset from an external power source and reduce consumption of oil fuel, in other words, alleviate the necessity of an oil fuel engine. Such a configuration is known as a plug in hybrid electric vehicle or a PHEV.

It is considered that even though the PHEV has a battery with a large storing capacity to store electric energy, the stored energy is used only to move the vehicle. When the vehicle is not moved, the battery system does not run (an idle state) and is not utilized. It is recognized that the stored electric energy of the PHEV is used to supply electrical energy when the power is supplied and a demand of a power system is in a peak state and such a concept is referred to as a vehicle to grid or a V2G.

Hereinafter, a power converting apparatus of an electric vehicle according to the related art will be described with reference to FIG. 1.

FIG. 1 is a view illustrating a circuit configuration of a power converting apparatus of an electric vehicle according to the related art.

As illustrated in FIG. 1, a power converting apparatus of an electric vehicle includes a first rectifier 10, a boost converter 11, a low voltage converter 12, a transformer 13, a second rectifier 14, a battery 15, an inverter 16, a motor 17, a mode selector 18, and a controller 19.

With this configuration, a charging mode operation of the battery 15 and a driving mode operation of the motor 17 will be described, respectively.

First, when a charging mode is selected by the mode selector 18, the first rectifier 10 full-wave rectifies a supplied AC voltage to output the AC voltage to the boost converter 11. Here, the input AC voltage is a single phase voltage and the first rectifier 10 full-wave rectifies the input single-phase voltage.

The boost converter 11 converts the full-wave rectified voltage which is output from the first rectifier 11 into a DC voltage to output the converted DC voltage to the low voltage converter 12.

The low voltage converter 12 is a DC-DC converter which includes a plurality of switching elements S1 to S4 and the plurality of switching elements is repeatedly turned on and turned off in accordance with a switching control signal which is provided from the controller 19 in accordance with the selected charging mode to generate the DC voltage.

The DC voltage generated as described above is converted into a predetermined voltage through the transformer 13, rectified by the second rectifier 14, and then charged into the battery 15.

In summary, when a charging mode is selected by the mode selector 18, the voltage from an AC power source (110 V or 220 V) which is a commercially used power source is full-wave rectified by the first rectifier 10 and an output voltage is converted through the boost converter 11, the low voltage converter 12, the transformer 13, and the second rectifier 14 in accordance with a battery charging voltage to charge the battery 15.

In the meantime, when the driving mode is selected by the mode selector 18, the controller 19 supplies a switching control signal to the inverter 16 to turn on the plurality of switching elements S1 to S6, thereby converting the DC output power of the battery 15 into power of a three-phase voltage suitable for the motor 17. Therefore, the converted three-phase power is supplied to the motor 17 to drive the motor 17. Here, the inverter 16 is a 70 KW or higher system and is configured with a three-phase structure.

When the power converting apparatus of the electric vehicle according to the related art as described above is configured with a three-phase structure, six or more high specification rectifier diodes are used as a rectifier diode at a secondary side of the OBC, so that cost may be increased.

In the meantime, in the power converting apparatus of the electric vehicle according to the related art, the OBC system and an inverter system for driving the motor are configured by a package having separate housings, so that a volume is increased and a weight is also increased.

SUMMARY

An exemplary embodiment of the present invention provides: a power converting apparatus of an electric vehicle, including: a charging unit which charges commercial power into a battery; an inverting unit which supplies battery power to drive a motor; a switching unit which is connected to the motor, the charging unit, and the inverting unit to be turned on/off in accordance with a switching control signal in accordance with an operation mode selection; and a controller which provides the switching control signal to the switching unit in accordance with a mode selection signal to perform the selected mode operation.

The charging unit may include a plurality of switching elements and diodes may be connected in parallel to the plurality of switching elements.

The apparatus may further include a mode selector which supplies a mode selection signal selected from the battery charging mode, the motor driving mode, and the V2G mode by the user, to the controller.

When the charging mode is selected through the mode selector by a user, the controller may control the switching unit to be turned off and controls to convert commercial power into battery storage power, by operating the switching element of the charging unit and then store the converted power in the battery.

The inverting unit may be connected to the switching unit and include a plurality of switching elements and diodes may be connected in parallel to the plurality of switching elements.

When the motor driving mode is selected through the mode selector by the user, the controller may control the switching unit to be turned on and operate the switching elements of the inverting unit to convert the battery power voltage into power for driving the motor and supply the power to the motor.

When the V2G mode is selected by the user, the controller may control the switching unit and the switching elements of the charging unit to be turned off and operate the switching elements of the inverting unit to transmit the battery storage power to a power source system through the charging unit.

The commercial power source may be a three-phase commercial power source and the plurality of switching elements of the charging unit and the plurality of switching elements of the inverting unit may be MOSFETs.

The charging unit and the inverting unit may bi-directionally operate in accordance with the control of the controller in order to perform the operation mode selected through the mode selector.

DETAILED DESCRIPTION OF EMBODIMENTS

Figure 1:
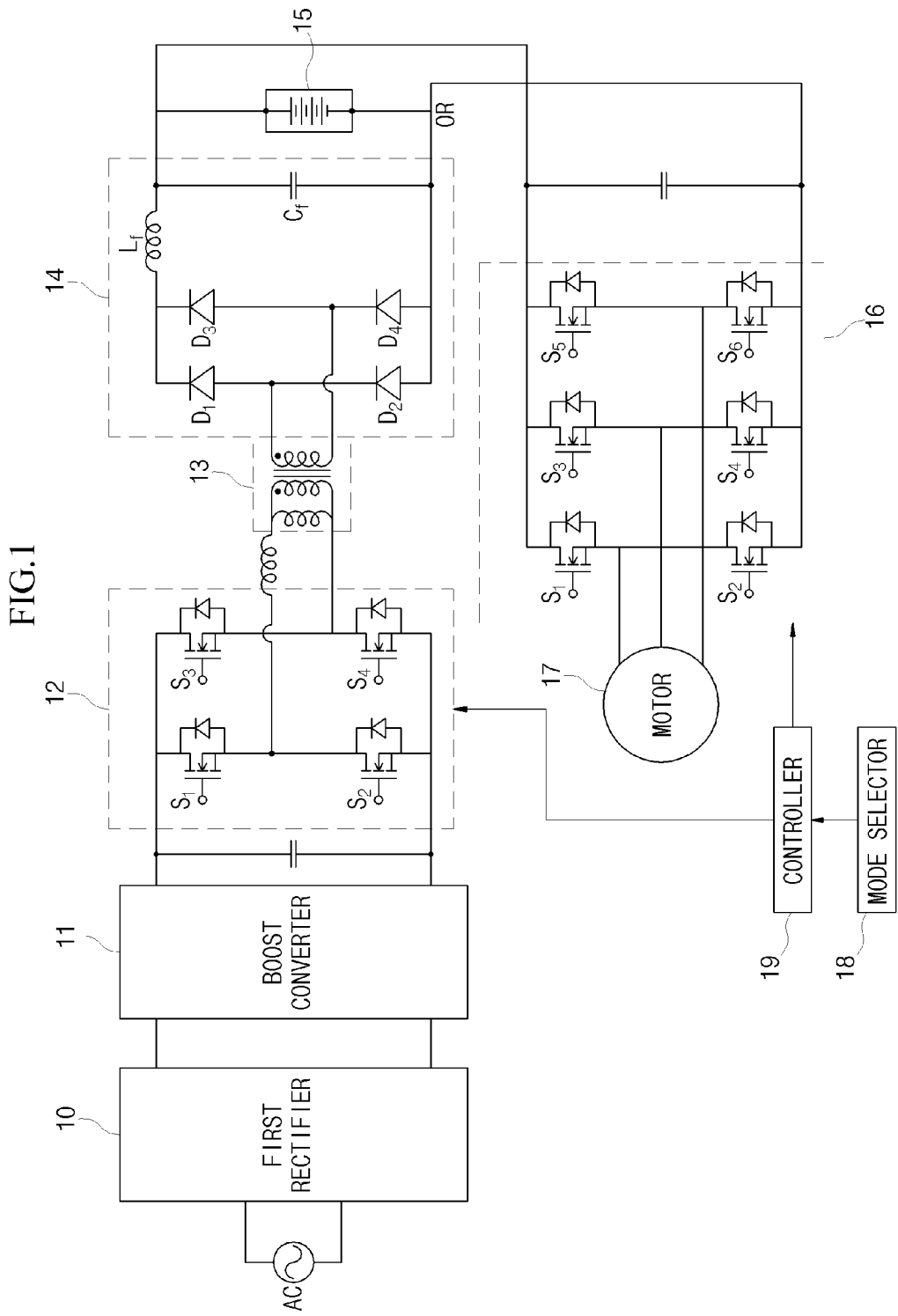
FIG. 1 is a view illustrating a circuit configuration of a power converting apparatus of an electric vehicle according to the related art.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals indicate like elements throughout the specification.

In the following description of the exemplary embodiment of the present invention, a detailed description of known configurations or functions incorporated herein will be omitted when it is determined that the detailed description may make the subject matter of the present invention unclear. Further, the terms used in the description are defined considering the functions of the exemplary embodiment of the present invention and may vary depending on the intention or usual practice of a user or operator. Accordingly, the terms need to be defined base on details throughout this specification.

Hereinafter, a power converting apparatus of an electric vehicle according to an exemplary embodiment of the present invention will be described with reference to FIG. 2.

Figure 2:
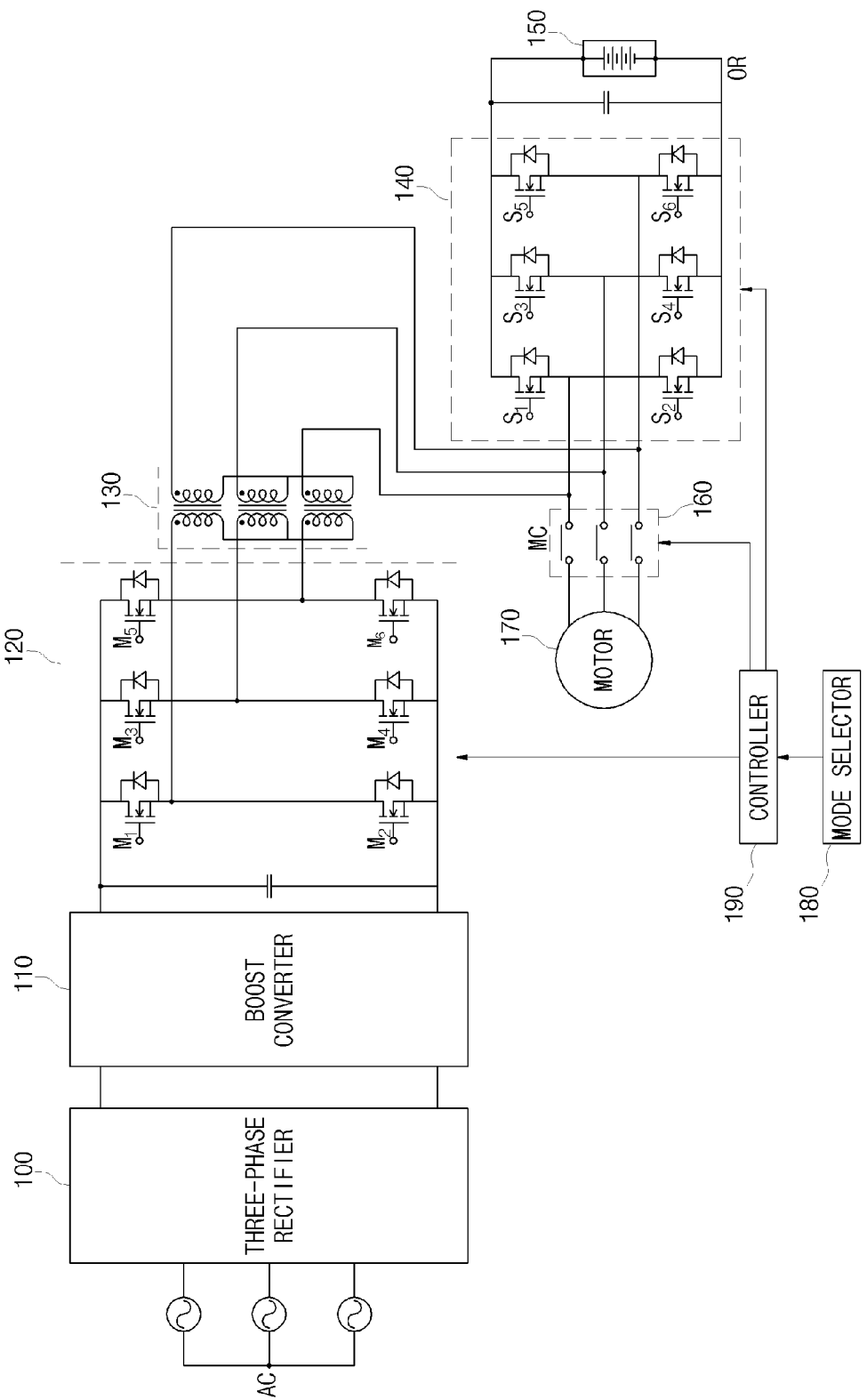
FIG. 2 is a view illustrating a circuit configuration of a power converting apparatus of an electric vehicle according to an exemplary embodiment of the present invention.

FIG. 2 is a view illustrating a circuit configuration of a power converting apparatus of an electric vehicle according to an exemplary embodiment of the present invention.

As illustrated in FIG. 2, a power converting apparatus of an electric vehicle according to an exemplary embodiment of the present invention includes a three-phase rectifier 100 which is connected to a three-phase commercial power source AC, a boost converter 110 which is connected to an output terminal of the three-phase rectifier 100, a low voltage converter 120 which is connected to an output terminal of the boost converter 110, a transformer 130 having a primary side core which is connected to an output terminal of the low voltage converter 130, an inverter 140 and a three-phase switching unit 160 which are connected to a secondary side core of the transformer 130, a battery 150 which is connected to an output terminal of the inverter 140, a motor 170 which is connected to the three-phase switching unit 160, a mode selector 180 which selects an operating mode, and a controller 190 which controls individual circuits in accordance with the mode selection of the mode selector 180 to control an operation for the selected mode.

Here, in accordance with the above-described configuration, the exemplary embodiment of the present invention is divided into an OBC system including the three-phase rectifier 100, the boost converter 110, the low voltage converter 120, and the transformer 130 and an inverting system including an inverter.

In the meantime, each of the boost converter 110, the low voltage converter 120, and the inverter 140 includes a bidirectional converter or a bidirectional inverter to perform operations in the charging mode, the motor driving mode, and the V2G mode.

In order to convert the three-phase power source, the low voltage converter 120 is configured such that six switching elements M1 to M6 are configured in series and in parallel and the switching elements are connected to diodes in parallel. Here, each switching element may be configured by a MOSFET.

The three-phase switching unit 160 is provided at a power input terminal of the motor 170 and is connected to the inverter 140 and the low voltage converter 130.

In order to supply the three-phase power to the motor 170, the inverter 140 is configured such that six switching elements S1 to S6 are configured in series and in parallel and the switching elements are connected to diodes in parallel. Here, each switching element may be configured by a MOSFET.

According to the exemplary embodiment of the present invention, the OBC system and the inverting system are configured by a single package to be provided in one housing.

The mode selector 180 selects the charging mode, the motor driving mode, and the V2G mode in accordance with the choice by the user and the mode selection signal selected by the mode selector 180 is provided to the controller 190. Here, the V2G mode is a mode where power is stored in the battery of the electric vehicle to transmit the stored power to a system power source (an electric grid).

The controller 190 controls the three-phase switching unit 160, the low voltage converter 120, and the inverter 140 to perform operations of the charging mode, the motor driving mode, and the V2G mode in accordance with the mode selection signal in the mode selector 180.

An operation for every mode selected by the mode selector 180 will be described.

When the user selects the charging mode using the mode selector 180, three-phase AC input powers having different phases are input to the three-phase rectifier 100.

The three-phase rectifier 100 full-wave rectifies the input three-phase input AC power and then provides the rectified voltage to the boost converter 110.

The boost converter 110 converts full-wave rectified three-phase AC power which is output from the three-phase rectifier 100 into DC power with a predetermined intensity to output the converted DC power to the low voltage converter 120.

The controller 190 turns off the three-phase switching unit 160 in accordance with the charging mode selected by the mode selector 180 and controls the plurality of switching elements M1 to M6 in the low voltage converter 120 to be repeatedly turned on and turned off, so that the DC-DC converted power is output to the transformer 130. Since the three-phase switching unit 160 is turned off, the DC power which is output through the transformer 130 is not provided to the motor 170 but is output to the inverter 140.

In this case, the controller 190 turns off the plurality of switching elements S1 to S6 in the inverter 140 in accordance with the charging mode selection to operate only a diode which is connected to each of the switching elements S1 to S6 in parallel. Therefore, the power which is output through the transformer 130 is rectified through the diodes and then charged in the battery 150.

When the user selects the motor driving mode through the mode selector 180, the controller 190 turns on the three-phase switching unit 160 and controls the plurality of switching elements S1 to S6 in the inverter 140 to be repeatedly turned on and turned off.

Accordingly, the power output from the battery 150 is converted into the three-phase AC power through the inverter 140 and then supplied to the motor 170 through the three-phase switching unit 160, thereby driving the motor 170.

In the meantime, when the V2G mode is selected by the mode selector 180, the controller 190 controls the three-phase switching unit 160 to be turned off so that the power of the battery 150 is not supplied to the motor 170.

In the meantime, the controller 190 controls the plurality of switching elements S1 to S6 of the inverter 140 to be repeatedly turned off and turned on in accordance with the V2G mode selection, so that output power of the battery 150 is supplied to the low voltage converter 120 through the transformer 130.

In accordance with the V2G mode selection, the controller 120 controls the plurality of switching elements M1 to M6 in the low voltage converter 120 to be turned off and only diodes which are connected to the plurality of switching elements M1 to M6 in parallel to operate so as to perform an operation of the V2G mode to transmit the power of the battery 150 which is supplied through the transformer 130 to the system power source through the boost converter 110 and the three-phase rectifier 100.

The operations for the modes described above will be described in brief. First, when the charging mode is selected through the mode selector 180, the controller 190 turns off the three-phase switching unit 160 and charges the input three-phase AC power in the battery through the three-phase rectifier 100, the boost converter 110, the low voltage converter 120, the transformer 130, and the inverter 140. In this case, the plurality of switching elements S1 to S6 in the inverter 140 is turned off in accordance with a control signal of the controller 190 to operate only the diodes which are connected to the switching elements S1 to S6 in parallel, thereby charging the battery.

When the motor driving mode is selected by the mode selector 180, the controller 190 turns on the three-phase switching unit 170 and repeatedly turns on and turns off the plurality of switching elements S1 to S6 in the inverter 140 to convert the power of the battery 150 into power for driving the motor 170 to be supplied to the motor 170, thereby performing the motor driving mode operation.

In the meantime, when the V2G mode is selected by the mode selector 180, the controller 190 turns off the three-phase switching unit 160 and repeatedly turns on and turns off the plurality of switching elements S1 to S6 in the inverter 140 to transmit the power of the battery 150 to the system power source through the transformer 130, the low voltage converter 120, the boost converter 110, and the three-phase rectifier 100, thereby performing the V2G mode operation.

According to the present invention, among three-phase OBC components, as a rectifier diode at a secondary side, a body diode of a power semiconductor of an inverter is used, so that the number of power semiconductor components may be reduced. That is, the number of diodes in the OBC of the related art is reduced so that a volume and a weight of the diode and a volume and a weight of a heat radiating system are reduced and two modules are combined to use a single housing, which may allow a heat radiating system to be light weight.

According to the present invention, the three-phase OBC and the inverter system are combined so that the OBC modules and the EPCU modules of the related are configured by a single package, thereby simplifying a process of assembling a finished vehicle.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power converting apparatus of an electric vehicle, comprising:
    a charging unit comprising first switches and first diodes connected in parallel to the first switches, the charging unit being configured to charge a battery from a power source;
    an inverting unit comprising second switches and second diodes connected in parallel to the second switches, the inverting unit being configured to supply power to a motor;
    a switching unit connected to the motor, the charging unit, and the inverting unit, wherein the switching unit is configured to operate according to a switching control signal; and
    a controller configured to provide the switching control signal to the switching unit according to a selected mode, and to repeatedly open and close the second switches to transmit power from the battery to the power source via a transformer, a boost converter, and a three-phase rectifier, in response to the selected mode being a Vehicle to Grid (V2G) mode.

2. The apparatus of claim 1, further comprising:
    a mode selector configured to supply a mode selection signal to the controller based on the selected mode.

3. The apparatus of claim 1, wherein the power source is a three-phase power source.

4. The apparatus of claim 1, wherein the first switches are MOSFETs.

5. The apparatus of claim 1, wherein the second switches are MOSFETs.

6. The apparatus of claim 1, wherein the controller is further configured to repeatedly open and close the first switches, in response to the selected mode being the V2G mode.

7. The apparatus of claim 2, wherein the controller is further configured to control the switching unit to be turned off and to transfer power from the power source to the battery by operating the first switches, in response to the selected mode being a charging mode.

8. The apparatus of claim 2, wherein the controller is further configured to control the switching unit to be turned on and to operate the second switches to convert the battery power voltage into power to drive the motor and to supply the power to the motor, in response to the selected mode being a motor driving mode.

9. The apparatus of claim 2, wherein the controller is further configured to control the switching unit and the first switches to be turned off and to operate the second switches to transmit the battery storage power to the power source through the charging unit, in response to the selected mode being the V2G mode.

10. The apparatus of claim 2, wherein the charging unit and the inverting unit are configured to bi-directionally operate.

* * * * *